US012577504B2

(12) United States Patent
Izmitli et al.

(10) Patent No.: US 12,577,504 B2
(45) Date of Patent: Mar. 17, 2026

(54) LIQUID LAUNDRY DETERGENT

(71) Applicants: Dow Global Technologies LLC, Midland, MI (US); Rohm and Haas Company, Collegeville, PA (US)

(72) Inventors: Aslin Izmitli, Spring City, PA (US); Michael C. Mitchell, Norristown, PA (US); Randara Pulukkody, Lansdale, PA (US); Muhunthan Sathiosatham, Chalfont, PA (US); Michael Tulchinsky, Midland, MI (US); Eric Wasserman, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 212 days.

(21) Appl. No.: 18/556,154

(22) PCT Filed: Jul. 13, 2022

(86) PCT No.: PCT/US2022/036885
§ 371 (c)(1),
(2) Date: Oct. 19, 2023

(87) PCT Pub. No.: WO2023/287834
PCT Pub. Date: Jan. 19, 2023

(65) Prior Publication Data

US 2024/0199994 A1 Jun. 20, 2024

Related U.S. Application Data

(60) Provisional application No. 63/222,454, filed on Jul. 16, 2021.

(51) Int. Cl.

*C11D 1/00* (2006.01)
*B08B 3/04* (2006.01)
*C11D 3/37* (2006.01)

(52) U.S. Cl.

CPC .......... *C11D 3/3723* (2013.01); *C11D 3/3707* (2013.01); *C11D 2111/12* (2024.01)

(58) Field of Classification Search

CPC ....... C11D 1/00; C11D 3/3707; C11D 3/3723; C11D 3/3769; B08B 3/04
See application file for complete search history.

(56) References Cited

U.S. PATENT DOCUMENTS 3,293,297 A 12/1966 Louvar et al.
4,108,922 A 8/1978 Crescentini et al.
4,272,394 A 6/1981 Kaneko
4,306,987 A 12/1981 Kaneko
7,884,137 B2 2/2011 Wang
8,759,276 B2 6/2014 Man et al.
9,605,163 B2 3/2017 Peera et al.
9,752,101 B2 9/2017 Loughnane et al.
2009/0005288 A1 1/2009 Boutique et al.
2010/0235776 A1 9/2010 Brown
(Continued)

FOREIGN PATENT DOCUMENTS

CN 107417904 12/2017
EP 0021431 1/1981
(Continued)

OTHER PUBLICATIONS

He, "Interfacial sciences in unconventional petroleum production: from fundamentals to applications." Chem. Soc. Rev. 2015, p. 5478-5480, vol. 44.

Levi "Influence of structure of surface-active succinic acid-derivatives containing polyethylene-glycol groups on the properties of these compounds", Colloid Journal of the USSR, 1985, p. 303-308, vol. 47.

Tulu, "Synthesis and properties of hydrophilic polymers. Part 7. Preparation, characterization and metal complexation of carboxy-functional polyesters based on poly(ethylene glycol)", Polym. Int. 1999, p. 909-914, vol. 48.

*Primary Examiner* — Brian P Mruk
(74) *Attorney, Agent, or Firm* — Thomas S. Deibert

(57) ABSTRACT

A liquid laundry detergent is provided, comprising: liquid carrier; cleaning surfactant; and cleaning booster of formula (I)

(I)

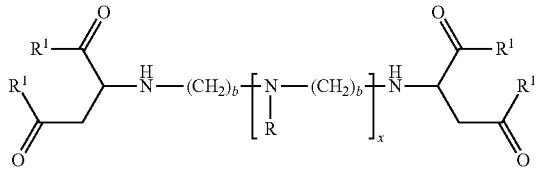

where b is 2 to 4; wherein x is 0 to 2; wherein each R is independently selected from the group consisting of a hydrogen, a $C_{1-22}$ alkyl group and a $-CH_2C(=O)R^1$ group; wherein each $R^1$ is independently of formula (II)

(II)

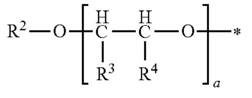

wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^3$ and $R^4$ is a hydrogen in each subunit a; and wherein a is 0 to 30.

10 Claims, No Drawings

(56) References Cited

U.S. PATENT DOCUMENTS

| | | | | |
|---|---|---|---|---|
| 2010/0261634 | A1 | 10/2010 | Misske et al. | |
| 2011/0152162 | A1 | 6/2011 | Schneiderman et al. | |
| 2013/0171210 | A1 | 7/2013 | Baker | |
| 2014/0066981 | A1* | 3/2014 | Heckroth | A61L 24/046 424/78.02 |
| 2014/0275405 | A1* | 9/2014 | Iezzi | C08G 18/3234 524/588 |
| 2015/0091009 | A1 | 4/2015 | Yamazaki et al. | |
| 2015/0148890 | A1 | 5/2015 | Hartley et al. | |
| 2015/0329479 | A1 | 11/2015 | Ma et al. | |
| 2019/0390012 | A1 | 12/2019 | Hueffer et al. | |

FOREIGN PATENT DOCUMENTS

| | | | | |
|---|---|---|---|---|
| EP | 0794245 | | 9/1997 | |
| WO | WO 96/06908 | * | 3/1996 | C11D 3/33 |
| WO | WO-9606908 A1 | * | 3/1996 | C11D 3/33 |
| WO | 2013180730 | | 12/2013 | |
| WO | 2018072979 | | 4/2018 | |

* cited by examiner

LIQUID LAUNDRY DETERGENT

This application is a 371 of PCT/US2022/036885, filed on Jul. 13, 2022, which claims benefit of Provisional Ser. No. 63/222,454, filed on Jul. 16, 2021.

The present invention relates to a liquid laundry detergent formulation. In particular, the present invention relates to a liquid laundry detergent formulation, comprising a liquid carrier, a cleaning surfactant and a cleaning booster, wherein the cleaning booster is of formula (I), (I)

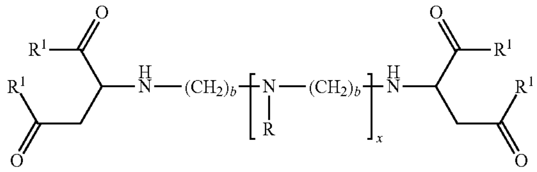

wherein b is 2 to 4; wherein x is 0 to 2; wherein each R is independently selected from the group consisting of a hydrogen, a $C_{1-22}$ alkyl group and a $-CH_2C(=O)R^1$ group; wherein each $R^1$ is independently of formula (II)

(II)

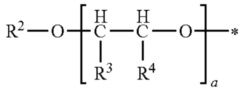

wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^3$ and $R^4$ is a hydrogen in each subunit a; and wherein a is 0 to 30.

Laundry detergents in liquid and gel forms providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to reduce the amount of surfactant per unit dose of the laundry detergent while maintaining overall cleaning performance.

One approach for reducing the unit dose of surfactant is to incorporate polymers into the liquid detergent formulations as described by Boutique et al. in U.S. Patent Application Publication No. 20090005288. Boutique et al. disclose a graft copolymer of polyethylene, polypropylene or polybutylene oxide with vinyl acetate in a weight ratio of from about 1:0.2 to about 1:10 for use in liquid or gel laundry detergent formulations having about 2 to about 20 wt % surfactant.

Notwithstanding, there remains a continuing need for liquid laundry detergent formulations exhibiting maintained primary cleaning performance with a reduced surfactant loading; preferably, while also providing improved anti-redeposition performance. There is also a continuing need for new cleaning boosters with improved biodegradability according to OECD 301F protocol when compared with conventional cleaning boosters.

The present invention provides a liquid laundry detergent formulation, comprising: a liquid carrier; a cleaning surfactant; and a cleaning booster, wherein the cleaning booster is of formula (I)

(I)

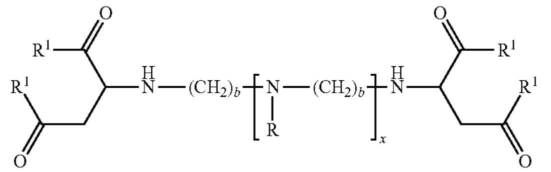

wherein b is 2 to 4; wherein x is 0 to 2; wherein each R is independently selected from the group consisting of a hydrogen, a $C_{1-22}$ alkyl group and a $-CH_2C(=O)R^1$ group; wherein each $R^1$ is independently of formula (II)

(II)

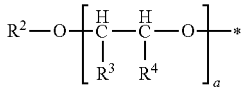

wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^3$ and $R^4$ is a hydrogen in each subunit a; and wherein a is 0 to 30.

The present invention provides a method of washing a fabric article, comprising: providing a soiled fabric article; providing a liquid laundry detergent formulation of the present invention; providing a wash water; and applying the wash water and the liquid laundry detergent formulation to the soiled fabric to provide a cleaned fabric article.

DETAILED DESCRIPTION

It has been surprisingly found that the liquid laundry detergent formulations with a cleaning booster as described herein facilitate improvement in primary cleaning performance for sebum soil removal, while imparting good anti-redeposition performance for dust sebum and clay; and also exhibiting desirable biodegradability profiles according to OECD 301F protocol.

Unless otherwise indicated, ratios, percentages, parts, and the like are by weight. Weight percentages (or wt %) in the composition are percentages of dry weight, i.e., excluding any water that may be present in the composition.

Preferably, the liquid laundry detergent formulation of the present invention, comprises a liquid carrier (preferably, 25 to 97.9 wt % (more preferably, 30 to 95.8 wt %; still more preferably, 40 to 93.5 wt %; yet more preferably, 45 to 91.75 wt %; most preferably, 50 to 89 wt %), based on weight of the liquid laundry detergent formulation, of the liquid carrier); a cleaning surfactant (preferably, 2 to 60 wt % (more preferably, 4 to 50 wt %; still more preferably, 6 to 40 wt %; yet more preferably, 7.5 to 35 wt %; most preferably, 10 to 30 wt %), based on weight of the liquid laundry detergent formulation, of the cleaning surfactant); and a cleaning booster (preferably, 0.1 to 15 wt % (more preferably, 0.2 to 12 wt %; still more preferably, 0.5 to 10 wt %; yet more preferably, 0.75 to 8 wt %; most preferably 1 to 7.5 wt %), based on weight of the liquid laundry detergent formulation, of the cleaning booster), wherein the cleaning booster is of formula (I)

(I)

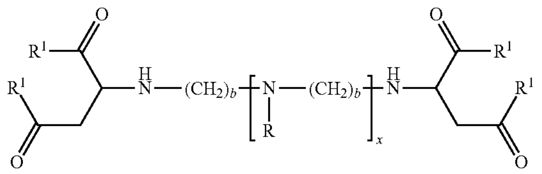

wherein b is 2 to 4 (preferably, 2); wherein x is 0 to 2 (preferably, 1); wherein each R is independently selected from the group consisting of a hydrogen, a $C_{1-22}$ alkyl group and a —$CH_2C$(═O)$R^1$ group (preferably, a hydrogen, a $C_{1-5}$ alkyl group and a —$CH_2C$(═O)$R^1$ group; more preferably, a hydrogen, a $C_{1-2}$ alkyl group and a —$CH_2C$(═O)$R^1$ group; still more preferably, a methyl and a —$CH_2C$(═O) $R^1$ group; most preferably, a methyl group); wherein each $R^1$ is independently of formula (II) (i.e., the individual occurrences of $R^1$ in formula (I) can be the same or different from one another)

(II)

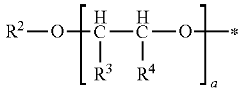

wherein the * indicates the point of attachment to formula (I); wherein $R^2$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^3$ and $R^4$ is independently selected from the group consisting of a hydrogen and a $C_{1-2}$ alkyl group, with the proviso that at least one of $R^3$ and $R^4$ is a hydrogen in each subunit a; and wherein a is 0 to 30 (preferably, 2 to 25; more preferably, 2 to 17; most preferably, 4 to 12).

Preferably, the liquid laundry detergent formulation of the present invention, comprises a liquid carrier. More preferably, the liquid laundry detergent formulation of the present invention comprises 25 to 97.9 wt % (preferably, 30 to 95.8 wt %; more preferably, 40 to 93.5 wt %; yet more preferably, 45 to 91.75 wt %; most preferably, 50 to 89 wt %), based on weight of the liquid laundry detergent formulation, of a liquid carrier. Still more preferably, the liquid laundry detergent formulation of the present invention comprises 25 to 97.9 wt % (preferably, 30 to 95.8 wt %; more preferably, 40 to 93.5 wt %; yet more preferably, 45 to 91.75 wt %; most preferably, 50 to 89 wt %), based on weight of the liquid laundry detergent formulation, of a liquid carrier; wherein the liquid carrier comprises water. Most preferably, the liquid laundry detergent formulation of the present invention comprises 25 to 97.9 wt % (preferably, 30 to 95.8 wt %; more preferably, 40 to 93.5 wt %; yet more preferably, 45 to 91.75 wt %; most preferably, 50 to 89 wt %), based on weight of the liquid laundry detergent formulation, of a liquid carrier; wherein the liquid carrier is water.

Preferably, the liquid carrier optionally includes a water miscible liquid, such as, $C_{1-3}$ alkanols, $C_{1-3}$ alkanediols and mixtures thereof. More preferably, the liquid carrier optionally includes 0 to 10 wt % (preferably, 0.2 to 8 wt %; more preferably, 0.5 to 7.5 wt %), based on weight of the liquid carrier, of water miscible liquids; wherein the water miscible liquids are selected from the group consisting of $C_{1-3}$ alkanols, $C_{1-3}$ alkanediols (e.g., propylene glycol) and mixtures thereof. Most preferably, the liquid carrier optionally includes 0 to 10 wt % (preferably, 0.2 to 8 wt %; more preferably, 0.5 to 7.5 wt %), based on weight of the liquid carrier, of water miscible liquids; wherein the water miscible liquids are selected from the group consisting of ethanol, propylene glycol and mixtures thereof.

Preferably, the liquid laundry detergent formulation of the present invention, comprises: a cleaning surfactant. More preferably, the liquid laundry detergent formulation of the present invention, comprises: 2 to 60 wt % (preferably, 4 to 50 wt %; more preferably, 6 to 40 wt %; yet more preferably, 7.5 to 35 wt %; most preferably, 10 to 30 wt %), based on weight of the liquid laundry detergent formulation, of a cleaning surfactant. Still more preferably, the liquid laundry detergent formulation of the present invention, comprises: 2 to 60 wt % (preferably, 4 to 50 wt %; more preferably, 6 to 40 wt %; yet more preferably, 7.5 to 35 wt %; most preferably, 10 to 30 wt %), based on weight of the liquid laundry detergent formulation, of a cleaning surfactant; wherein the cleaning surfactant is selected from the group consisting of anionic surfactants, nonionic surfactants, cationic surfactants, amphoteric surfactants and mixtures thereof. Yet still more preferably, the liquid laundry detergent formulation of the present invention, comprises: 2 to 60 wt % (preferably, 4 to 50 wt %; more preferably, 6 to 40 wt %; yet more preferably, 7.5 to 35 wt %; most preferably, 10 to 30 wt %), based on weight of the liquid laundry detergent formulation, of a cleaning surfactant; wherein the cleaning surfactant is selected from the group consisting of a mixture including an anionic surfactant and a non-ionic surfactant. Most preferably, the liquid laundry detergent formulation of the present invention, comprises: 2 to 60 wt % (preferably, 4 to 50 wt %; more preferably, 6 to 40 wt %; yet more preferably, 7.5 to 35 wt %; most preferably, 10 to 30 wt %), based on weight of the liquid laundry detergent formulation, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-20}$ alkyl polyethoxy sulfates and mixtures thereof. More preferred anionic surfactants include $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate, $C_{12-16}$ alkyl polyethoxy sulfate and mixtures thereof.

Non-ionic surfactants include alkoxylates (e.g., polyglycol ethers, fatty alcohol polyglycol ethers, alkylphenol polyglycol ethers, end group capped polyglycol ethers, mixed ethers, hydroxy mixed ethers, fatty acid polyglycol esters and mixtures thereof. Preferred non-ionic surfactants include fatty alcohol polyglycol ethers. More preferred non-ionic surfactants include secondary alcohol ethoxylates, ethoxylated 2-ethylhexanol, ethoxylated seed oils, butanol caped ethoxylated 2-ethylhexanol and mixtures thereof. Most preferred non-ionic surfactants include secondary alcohol ethoxylates.

Cationic surfactants include quaternary surface active compounds. Preferred cationic surfactants include quaternary surface active compounds having at least one of an ammonium group, a sulfonium group, a phosphonium group, an iodonium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride di-tallow dimethyl ammonium chloride and di-tallow dimethyl ammonium chloride. Most preferred cationic surfactant includes di-tallow dimethyl ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the liquid laundry detergent formulation of the present invention, comprises: 0.1 to 15 wt % (preferably, 0.2 to 12 wt %; more preferably, 0.5 to 10 wt %; yet more preferably, 0.75 to 8 wt %; most preferably 1 to 7.5 wt %), based on weight of the liquid laundry detergent formulation, of the cleaning booster; wherein the cleaning booster is of formula (I)

(I)

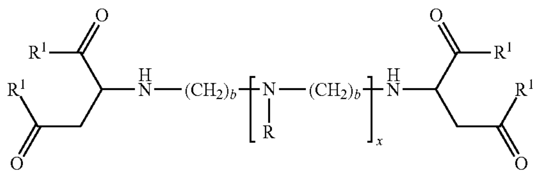

wherein b is 2 to 4 (preferably, 2); wherein x is 0 to 2 (preferably, 1); wherein each R is independently selected from the group consisting of a hydrogen, a $C_{1-22}$ alkyl group and a $—CH_2C(=O)R^1$ group (preferably, a hydrogen, a $C_{1-5}$ alkyl group and a $—CH_2C(=O)R^1$ group; more preferably, a hydrogen, a $C_{1-2}$ alkyl group and a $—CH_2C(=O)R^1$ group; still more preferably, a methyl and a $—CH_2C(=O)R^1$ group; most preferably, a methyl group); wherein each $R^1$ is independently of formula (II) (i.e., the individual occurrences of $R^1$ in formula (I) can be the same or different from one another)

(II)

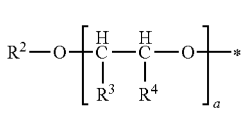

wherein the * indicates the point of attachment to formula (I); wherein $R^2$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^3$ and $R^4$ is independently selected from the group consisting of a hydrogen and a $C_{1-2}$ alkyl group, with the proviso that at least one of $R^3$ and $R^4$ is a hydrogen in each subunit a; and wherein a is 0 to 30 (preferably, 2 to 25; more preferably, 2 to 17; most preferably, 4 to 12).

More preferably, the liquid laundry detergent formulation of the present invention, comprises: 0.1 to 15 wt % (preferably, 0.2 to 12 wt %; more preferably, 0.5 to 10 wt %; yet more preferably, 0.75 to 8 wt %; most preferably 1 to 7.5 wt %), based on weight of the liquid laundry detergent formulation, of the cleaning booster; wherein the cleaning booster is of formula (I); wherein b is 2 to 4 (preferably, 2); wherein x is 0 to 2 (preferably, 1); wherein each R is independently selected from the group consisting of a hydrogen, a $C_{1-22}$ alkyl group and a $—CH_2C(=O)R^1$ group (preferably, a hydrogen, a $C_{1-5}$ alkyl group and a $—CH_2C(=O)R^1$ group; more preferably, a hydrogen, a $C_{1-2}$ alkyl group and a $—CH_2C(=O)R^1$ group; still more preferably, a methyl and a $—CH_2C(=O)R^1$ group; most preferably, a methyl group); wherein each $R^1$ is independently of formula (II) (i.e., the individual occurrences of $R^1$ in formula (I) can be the same or different from one another); wherein the * indicates the point of attachment to formula (I); wherein $R^2$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^3$ and $R^4$ is independently selected from the group consisting of a hydrogen and a $C_{1-2}$ alkyl group, with the proviso that at least one of $R^3$ and $R^4$ is a hydrogen in each subunit a; wherein a is 0 to 30; and wherein a is 2 to 30 (preferably, 2 to 25; more preferably, 2 to 17; most preferably, 4 to 12) in 70 to 100 mol % (preferably, 80 to 100 mol %; more preferably, 90 to 100 mol %; most preferably, 95 to 100 mol %) of the occurrences of formula (II) in the cleaning booster.

Still more preferably, the liquid laundry detergent formulation of the present invention, comprises: 0.1 to 15 wt % (preferably, 0.2 to 12 wt %; more preferably, 0.5 to 10 wt %; yet more preferably, 0.75 to 8 wt %; most preferably 1 to 7.5 wt %), based on weight of the liquid laundry detergent formulation, of the cleaning booster; wherein the cleaning booster is of formula (I); wherein b is 2 to 4 (preferably, 2); wherein x is 0 to 2 (preferably, 1); wherein each R is independently selected from the group consisting of a hydrogen, a $C_{1-22}$ alkyl group and a $—CH_2C(=O)R^1$ group (preferably, a hydrogen, a $C_{1-5}$ alkyl group and a —$CH_2C$(=O)$R^1$ group; more preferably, a hydrogen, a $C_{1-2}$ alkyl group and a —$CH_2C$(=O)$R^1$ group; still more preferably, a methyl and a —$CH_2C$(=O)$R^1$ group; most preferably, a methyl group); wherein each $R^1$ is independently of formula (II) (i.e., the individual occurrences of $R^1$ in formula (I) can be the same or different from one another); wherein the * indicates the point of attachment to formula (I); wherein $R^2$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^3$ and $R^4$ is independently selected from the group consisting of a hydrogen and a $C_{1-2}$ alkyl group, with the proviso that at least one of $R^3$ and $R^4$ is a hydrogen in each subunit a; wherein a is 0 to 30; and wherein 70 to 100 mol % (preferably, 80 to 100 mol %; more preferably, 90 to 100 mol %; most preferably, 95 to 100 mol %) of the $R^1$ groups in the cleaning booster of formula (II) are of formula (IIa)

$$R^5\text{—O—}[CH_2CH(R^6)O]_y\text{—}* \qquad \text{(IIa)}$$

wherein the * indicates the point of attachment to formula (I); wherein $R^5$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a $C_{1-4}$ alkyl group; most preferably, a $C_4$ alkyl group); wherein each $R^6$ is independently selected from the group consisting of a hydrogen and a $C_{1-2}$ alkyl group; and wherein y is 2 to 30 (preferably, 2 to 25; more preferably, 2 to 17; most preferably, 4 to 12).

Most preferably, the liquid laundry detergent formulation of the present invention, comprises: 0.1 to 15 wt % (preferably, 0.2 to 12 wt %; more preferably, 0.5 to 10 wt %; yet more preferably, 0.75 to 8 wt %; most preferably 1 to 7.5 wt %), based on weight of the liquid laundry detergent formulation, of the cleaning booster; wherein the cleaning booster is of formula (I); wherein b is 2 to 4 (preferably, 2); wherein x is 0 to 2 (preferably, 1); wherein each R is independently selected from the group consisting of a hydrogen, a $C_{1-22}$ alkyl group and a —$CH_2C$(=O)$R^1$ group (preferably, a hydrogen, a $C_{1-5}$ alkyl group and a —$CH_2C$(=O)$R^1$ group; more preferably, a hydrogen, a $C_{1-2}$ alkyl group and a —$CH_2C$(=O)$R^1$ group; still more preferably, a methyl and a —$CH_2C$(=O)$R^1$ group; most preferably, a methyl group); wherein each $R^1$ is independently of formula (II) (i.e., the individual occurrences of $R^1$ in formula (I) can be the same or different from one another); wherein the * indicates the point of attachment to formula (I); wherein $R^2$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group); wherein each $R^3$ and $R^4$ is independently selected from the group consisting of a hydrogen and a $C_{1-2}$ alkyl group, with the proviso that at least one of $R^3$ and $R^4$ is a hydrogen in each subunit a; wherein a is 0 to 30; and wherein 70 to 100 mol % (preferably, 80 to 100 mol %; more preferably, 90 to 100 mol %; most preferably, 95 to 100 mol %) of the $R^1$ groups in the cleaning booster of formula (II) are of formula (IIb)

$$R^7\text{—O-(EO)}_h\text{—(PO)}_i\text{-(EO)}_j\text{—}* \qquad \text{(IIb)}$$

wherein the * indicates the point of attachment to formula (Ia); wherein $R^7$ is selected from the group consisting of a hydrogen and a $C_{1-12}$ alkyl group (preferably, a hydrogen and a $C_{1-12}$ alkyl group; more preferably, a hydrogen and a $C_{1-5}$ alkyl group; still more preferably, a $C_{1-4}$ alkyl group; most preferably, a $C_4$ alkyl group); wherein EO is an ethylene oxide group; wherein PO is a propylene oxide group; wherein h is 0 to 30 (preferably, 0 to 5; more preferably, 0 to 2; most preferably, 0 to 1); wherein i is 0 to 30 (preferably, 0 to 10; more preferably, 0 to 7; most preferably, 2 to 5); wherein j is 0 and 30 (preferably, 2 to 10; more preferably, 2 to 8; most preferably, 2 to 6); and wherein h+i+j is 2 to 30 (preferably, 2 to 25; more preferably, 2 to 17; most preferably, 4 to 12).

Preferably, the liquid laundry detergent formulation of the present invention, optionally further comprises a structurant. More preferably, the liquid laundry detergent formulation of the present invention, further comprises 0 to 2 wt % (preferably, 0.05 to 0.8 wt %; more preferably, 0.1 to 0.4 wt %), based on weight of the liquid laundry detergent formulation, of a structurant. Most preferably, the liquid laundry detergent formulation of the present invention, further comprises 0 to 2 wt % (preferably, 0.05 to 0.8 wt %; more preferably, 0.1 to 0.4 wt %), based on weight of the liquid laundry detergent formulation, of a structurant; wherein the structurant is a non-polymeric, crystalline hydroxy-functional materials capable of forming thread like structuring systems throughout the liquid laundry detergent formulation when crystallized in situ.

Preferably, the liquid laundry detergent formulation of the present invention, optionally further comprises a hydrotrope. More preferably, the liquid laundry detergent formulation of the present invention, optionally further comprises: 0 to 15 wt % (preferably, 0.1 to 12 wt %; more preferably, 0.2 to 10 wt %; most preferably, 0.5 to 7.5 wt %), based on the weight of the liquid laundry detergent formulation, of a hydrotrope. More preferably, the liquid laundry detergent formulation of the present invention, optionally further comprises: 0 to 15 wt % (preferably, 0.1 to 12 wt %; more preferably, 0.2 to 10 wt %; most preferably, 0.5 to 7.5 wt %), based on the weight of the liquid laundry detergent formulation, of a hydrotrope; wherein the hydrotrope is selected from the group consisting of alkyl hydroxides; glycols; urea; monoethanolamine; diethanolamine; triethanolamine; calcium, sodium, potassium, ammonium and alkanol ammonium salts of xylene sulfonic acid, toluene sulfonic acid, ethylbenzene sulfonic acid, naphthalene sulfonic acid and cumene sulfonic acid; salts thereof and mixtures thereof. Most preferably, the liquid laundry detergent formulation of the present invention, further comprises: 0 to 15 wt % (preferably, 0.1 to 12 wt %; more preferably, 0.2 to 10 wt %; most preferably, 0.5 to 7.5 wt %), based on the weight of the liquid laundry detergent formulation, of a hydrotrope; wherein the hydrotrope is selected from the group consisting of ethanol, propylene glycol, sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof.

Preferably, the liquid laundry detergent formulation of the present invention, optionally further comprises a fragrance. More preferably, the liquid laundry detergent formulation of the present invention, optionally further comprises: 0 to 10 wt % (preferably, 0.001 to 5 wt %; more preferably, 0.005 to 3 wt %; most preferably, 0.01 to 2.5 wt %), based on the weight of the liquid laundry detergent formulation, of a fragrance.

Preferably, the liquid laundry detergent formulation of the present invention, optionally further comprises a builder. More preferably, the liquid laundry detergent formulation of the present invention, optionally further comprises: 0 to 50 wt % (preferably, 5 to 50 wt %; more preferably, 7.5 to 30 wt %), based on the weight of the liquid laundry detergent formulation, of a builder. Most preferably, the liquid laundry detergent formulation of the present invention, optionally further comprises: 0 to 50 wt % (preferably, 5 to 50 wt %; more preferably, 7.5 to 30 wt %), based on the weight of the liquid laundry detergent formulation, of a builder; wherein the builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylenephosphonic acid; salts of ethylenediaminetetraethylenephosphonic acid; oligomeric phosphonates; polymeric phosphonates; mixtures thereof.

Preferably, the liquid laundry detergent formulation of the present invention, optionally further comprises a fabric softener. More preferably, the liquid laundry detergent formulation of the present invention, optionally further comprises: 0 to 10 wt % (preferably, 0.5 to 10 wt %), based on the weight of the liquid laundry detergent formulation, of a fabric softener. Most preferably, the liquid laundry detergent formulation of the present invention, optionally further comprises: 0 to 10 wt % (preferably, 0.5 to 10 wt %), based on the weight of the liquid laundry detergent formulation, of a fabric softener; wherein the fabric softener is a cationic coacervating polymer (e.g., cationic hydroxyl ethyl cellulose; polyquaternium polymers and combinations thereof).

Preferably, the liquid laundry detergent formulation of the present invention, optionally further comprises a pH adjusting agent. More preferably, the liquid laundry detergent formulation of the present invention, optionally further comprises a pH adjusting agent; wherein the liquid laundry detergent formulation has a pH from 6 to 12.5 (preferably, 6.5 to 11; more preferably, 7.5 to 10). Bases for adjusting pH include mineral bases such as sodium hydroxide (including soda ash) and potassium hydroxide; sodium bicarbonate; sodium silicate; ammonium hydroxide; and organic bases (e.g., mono-, di- or tri-ethanolamine; and 2-dimethylamino-2-methyl-1-propanol (DMAMP)). Acids to adjust the pH include mineral acids (e.g., hydrochloric acid, phosphorus acid and sulfuric acid) and organic acids (e.g., acetic acid).

Preferably, the method of washing a fabric article of the present invention, comprises: providing a soiled fabric article (preferably, wherein the soiled fabric article is soiled with at least one of sebum oil, dust and clay soil; more preferably, wherein the soiled fabric article is soiled with sebum oils and clay soil)(preferably, wherein the soiled fabric article is selected from the group consisting of stained cotton fabric, stained cotton interlock fabric, stained cotton terry fabric, stained polyester cotton blend fabric, stained polyester knit fabric, stained polyester woven fabric and mixtures thereof; more preferably, wherein the soiled fabric article is at least one of stained cotton fabric and stained cotton interlock fabric); providing a liquid laundry detergent formulation of the present invention; providing a wash water; and applying the wash water and the liquid laundry detergent formulation to the soiled fabric to provide a cleaned fabric article. More preferably, the method of washing a fabric article of the present invention, comprises: providing a soiled fabric article (preferably, wherein the soiled fabric article is soiled with at least one of sebum oil, dust and clay soil; more preferably, wherein the soiled fabric article is soiled with sebum oils and clay soil)(preferably, wherein the soiled fabric article is selected from the group consisting of stained cotton fabric, stained cotton interlock fabric, stained cotton terry fabric, stained polyester cotton blend fabric, stained polyester knit fabric, stained polyester woven fabric and mixtures thereof; more preferably, wherein the soiled fabric article is at least one of stained cotton fabric and stained cotton interlock fabric); providing a liquid laundry detergent formulation of the present invention; providing a wash water; providing a rinse water; applying the wash water and the liquid laundry detergent formulation to the soiled fabric to provide a cleaned fabric article; and then applying the rinse water to the cleaned fabric article to remove the liquid laundry detergent formulation from the cleaned fabric article.

Some embodiments of the present invention will now be described in detail in the following Examples.

Reagents used in the Examples are described in Table 1.

TABLE 1

| Identifier | Description |
|---|---|
| Ethylene glycol monobutyl ether | available from The Dow Chemical Company under tradename BUTYL CELLOSOLVE ™ |
| AE1 | $C_{12-15}$ alcohol ethoxylate-9 (600 g/mol) available from Stepan Company under tradename BIO-SOFT ® N25-9 |
| AE2 | $C_{12-15}$ alcohol ethoxylate-7 (510 g/mol) available from Stepan Company under tradename BIO-SOFT ® N25-7 |
| EO | Ethylene oxide |
| PO | Propylene oxide |
| Titanium isopropoxide | available from Sigma Aldrich |
| Dimethyl maleate | 97% available from TCI Chemicals |

Synthesis S1: EO-Terminated Block PO-Copolymer

Potassium hydride (0.5 g) was dissolved with stirring, under nitrogen, in ethylene glycol monobutyl ether (25 g). Of this mixture, 23.6 g was charged by syringe to a nitrogen-purged reactor. The reactor was sealed and then charged with propylene oxide (41.5 g; 50.0 mL) at 120° C. with a pumping rate of 1 mL/min. A reactor pressure increase was noted as the propylene oxide was added. The reactor contents were allowed to react with the addition of the propylene oxide for 9 hours; during which time the reactor pressure was observed to decrease and then leveled off as the propylene oxide was consumed. Then ethylene oxide (33.5 g; 38.0 mL) was charged to the reactor contents at 130° C. with a pumping rate of 1 m/min. The reactor contents were allowed to react with the addition of the ethylene oxide for 4 hours. The reactor was then vented, purged with nitrogen, and the product was recovered. The yield was quantitative. $^1$H NMR ($CDCl_3$, δ, ppm): 0.90 t (3H, $CH_3$), 1.13 m (8.48H, $CH_3$ of PO), 1.35 m (2H, $CH_2$), 1.55 m (2H, $CH_2$), 3.55 m (35.93H, $CHCH_2$ of PO+$CH_2CH_2$ of EO). NMR analysis suggested the following formula for the recovered product: $CH_3CH_2CH_2CH_2OCH_2CH_2O(PO)_{2.83}(EO)_{5.36}H$. GPC (in THF): $M_n$=739, $M_w$=859, PDI=1.16. For the purposes of calculating reaction stoichiometries in the referenced Syntheses to follow, the FW calculated from the established above empirical formula from NMR was used: 519 Daltons.

Synthesis S2: EO-Terminated Block PO-Copolymer

Potassium hydride (0.4 g) was dissolved with stirring, under nitrogen, in ethylene glycol monobutyl ether (20.75 g). Of this mixture, 21.15 g was charged by syringe to a nitrogen-purged reactor. The reactor was sealed and then charged with propylene oxide (41.5 g; 50.0 mL) at 115° C. with a pumping rate of 1 mL/min. A reactor pressure increase was noted as the propylene oxide was added. The reactor contents were allowed to react with the addition of the propylene oxide for 22 hours; during which time the reactor pressure was observed to decrease and then leveled off as the propylene oxide was consumed. Then ethylene oxide (28.85 g; 33.0 mL) was charged to the reactor contents at 130° C. with a pumping rate of 1 m/min. The reactor contents were allowed to react with the addition of the ethylene oxide for 4 hours. The reactor was then vented, purged with nitrogen, and the product was recovered. The yield was 85.4 g (93%). $^1$H NMR ($CDCl_3$, δ, ppm): 0.90 t (3H, $CH_3$), 1.13 m (11.05H, $CH_3$ of PO), 1.35 m (2H, $CH_2$), 1.55 m (2H, $CH_2$), 3.55 m (31.02H, $CHCH_2$ of PO+$CH_2CH_2$ of EO). NMR analysis suggests the following formula: $CH_3CH_2CH_2CH_2OCH_2CH_2O(PO)_{3.68}(EO)_{3.49}H$. GPC (in THF): $M_n$=641, $M_w$=761, PDI=1.19. For the purposes of calculating reaction stoichiometries in the examples to follow, the FW calculated from the established above empirical formula from NMR was used: 486 Daltons.

Synthesis S3: Dimethyl maleate plus 3,3'-diamino-n-methyldipropylamine 3,3'-diamino-n-methyldipropylamine (7.492 g, 50.5 mmol) was charged to a glass vial with a magnetic stir bar. The vial was sealed with a cap containing a septum and then placed in an ice bath on top of a magnetic stirrer for gentle mixing. A needle-style thermocouple probe was inserted through the septum to record the temperature. Dimethyl maleate (15.050 g, 101 mmol, 2.0 eq.) was then slowly delivered via syringe over 30 minutes into the vial to control the exothermic reaction to the extent of achieving a maximum internal temperature of 25.1° C. After the dimethyl maleate addition, the vial was heated in an OptiTHERM® Reaction Block attached to an IKA magnetic stirring/heating plate with a target temperature of 45° C. The vial contents ware maintained at a temperature of 44.0 to 46.5° C. for two hours. The clear faint yellow oily product was then cooled and characterized. $^1$H NMR (acetone-$d_6$, δ, ppm): 6.80* (s, 0.1H), 3.87-3.74 (0.4H), 3.69 (s, 5.6H), 3.63 (s, 5.6H), 3.59 (t, J=6.9 Hz, 2.0H), 2.76-2.62 (3.8H), 2.62-2.44 (4.0H), 2.32 (tt, J=6.6, 3.3 Hz, 4.2H), 2.13 (s, 3.7H), 1.55 (m, J=6.9 Hz, 4.0H). $^{13}$C {$^1$H} NMR (acetone-$d_6$, δ, ppm): 174.71 (2.1C), 171.82 (2.2C), 165.72* (0.1C), 133.98* (0.2C), 58.68 (2.1C), 56.71 (2.1C), 53.96-50.50 (5.4C), 48.46-46.19 (2.0C), 42.48 (1.1C), 38.52 (2.0C), 28.60 (2.0C). (Peaks marked with an asterisk were attributed to dimethyl fumarate byproduct.)

Synthesis S4: Transesterification with Alkoxylated Butanol

Product prepared according to Synthesis S3 (1.9897 g, 4.59 mmol), EO-terminated block copolymer prepared according to Synthesis S1 (10.0177 g, 19.3 mmol, 4.2 eq.) and titanium isopropoxide (0.1765 g, 0.6210 mmol, 14 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 100° C. After reaching 100° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 109.2-118.2° C. for six hours under vacuum. The flask contents were then cooled and characterized. On the basis of $^{13}$C NMR spectrum taken in $CDCl_3$, the ratio of residual methyl ester carbons (51.8 ppm) to methyl carbons attached to N (42.1 ppm) is 0.28:1, and the ratio of $CH_2OH$ groups (61.4 ppm) to methyl carbons attached to N is 0.17:1. Given the ratio of methyl carbons associated with the butyl groups of alkoxylated butanol (13.9 ppm) to the methyl carbons attached to N being 4:1, it appears the extent of reaction was >90%.

Synthesis S5: Transesterification of Dimethyl Maleate Adduct with Alkoxylated Butanol EO-terminated block copolymer prepared according to Synthesis S2 (10.0862 g, 20.8 mmol, 4.4 eq.), material prepared according to Synthesis S3 (2.0554 g, 4.74 mmol) and titanium isopropoxide (0.1769 g, 0.62 mmol, 13 mol %) were charged to a 250 mL flask with a magnetic stir bar. The flask was sealed with hydrocarbon grease, purged with nitrogen and then heated in an OptiTHERM® Reaction Block attached to an IKA magnetic heating plate with a set point temperature of 120° C. After reaching 112.8° C., vacuum was applied to the flask contents via a mechanical pump with an intervening solvent trap cooled with a dry ice/acetone bath. The mixing speed was adjusted from a setting of 50 to 300 rpm as the contents of the flask were heated to account for changes in viscosity. The flask contents were held at a temperature of 119.9-121.2° C. for seven hours under vacuum. The flask contents were then cooled and characterized. On the basis of $^{13}$C NMR spectrum taken in $CDCl_3$, the extent of reaction was >95% due to the disappearance of the signal for residual methyl ester carbons (51.8 ppm).

Comparative Examples C1-C2 and Examples 1-2: Liquid Laundry Detergent

The liquid laundry detergent formulations used in the cleaning tests in the subsequent Examples were prepared having the generic formulation as described in TABLE 2 with the cleaning booster as noted in TABLE 3 neutralized to a pH of 8.5 were prepared by standard liquid laundry formulation preparation procedures.

TABLE 2

| Ingredient | Commercial Name | wt % |
|---|---|---|
| Linear alkyl benzene sulfonate | Nacconal 90G* | 16.0 |
| Sodium lauryl ethoxysulfate | Steol CS-460* | 4.0 |
| Propylene glycol | — | 5.0 |
| Ethanol | — | 2.0 |
| Sodium citrate | — | 5.0 |
| Non-ionic surfactant | Biosoft N25-7* | 5.0 |
| Sodium xylenesulfonate | Stepanate SXS-93 | 5.5 |
| Fatty acid | Prifac 7908[a] | 3.0 |
| Cleaning Booster | — | 5.0 |
| Deionized water | — | QS to 100 |

*available from Stepan Company
[a]available from Croda

TABLE 3

| Example | Cleaning Booster |
|---|---|
| Comparative Example C1 | none |
| Comparative Example C2 | Alcohol ethoxylate[1] |
| Example 1 | Synthesis S4 |
| Example 2 | Synthesis S5 |

[1]available from Stepan Company under the tradename BIO-SOFT ® N25-9

Primary Cleaning Performance

The primary cleaning performance of the liquid laundry detergent formulations of Comparative Examples $C_1$-$C_2$ and Examples 1-2 were assessed in a Launder-Ometer (SDL Atlas, Model M228AA) at a set test temperature of 22° C. using an 18 minute wash cycle. Twenty of the 1.2 liter canisters were filled with 500 mL of hardness adjusted water at 100 ppm by mass with 2:1 Ca:Mg molar ratio were used for each run. The washed fabrics were rinsed in 300 mL of 100 ppm (2/1 Ca/Mg) hardness adjusted water at ambient temperature for 5 minutes at 260 osc/min pm on an Eberbach E6000 reciprocal shaker. The stained fabrics and soiled ballasts used in the tests were PCS—S-132 high discriminative sebum BEY pigment and PCS—S-94 sebum/dust ASTM stains from Testfabrics stitched to a pre-shrunk cotton interlock fabric. The size of the cotton interlock was 5×5 cm. The stained swatches were 2.5×3 cm. One 5×5 cm cut SBL-CFT soil ballast was added to each canister to provide baseline soil to the wash solution. The total surfactant concentration in the wash liquor was 200 ppm.

Reflectance Measurement and Stain Removal Index (SRI)

The soil removal index (SRI) for each of the Liquid Laundry Detergent formulations evaluated in Primary Cleaning Performance Test were determined using ASTM Method D4265-14. The average SRI taken from 8 swatches per condition (two swatches per pot, 4 pots) is provided in Table 4.

The L*, a* and b* values of the stained fabrics were measured pre and post wash with a Mach 5 spectrophotometer from Colour Consult. The L*, a* and b* values for the unwashed, unstained polycotton fabric was measured in the SRI calculations as follows:

$$SRI = \frac{(\Delta E^*_{(US-UF)} - \Delta E^*_{(WS-UF)})}{\Delta E^*_{(US-UF)}} \times 100$$

wherein US is the unwashed stain area, UF is the unwashed (unstained) fabric area, WS is the washed stain area, $\Delta E^*_{(US\text{-}UF)}$ is the ΔE* color difference between the unwashed stain and the unwashed fabric and $\Delta E^*_{(WS-UF)}$ is the ΔE* color difference between the washed stain and the unwashed fabric. The value of ΔE* is calculated as $$\Delta E^* = (\Delta L^{*2} + \Delta a^{*2} + \Delta b^{*2})^{1/2}$$

The ΔSRI values provided in Table 4 give the difference between the SRI measured for the noted example relative to the SRI measured for Comparative Example C1. A positive value indicates an increase in soil removal relative to Comparative Example C1.

TABLE 4

| | | ΔSRI | |
|---|---|---|---|
| Example | Cleaning Booster | PCS-94 | PCS-132 |
| Comparative Example C2 | Alcohol ethoxylate[1] | 4.37 | 2.65 |
| Example 1 | Synthesis S4 | 6.72 | 4.60 |
| Example 2 | Synthesis S5 | 3.92 | 3.62 |

[1]available from Stepan Company under the tradename BIO-SOFT ® N25-9

Comparative Examples C3-C4 and Example 3: Liquid Laundry Detergent

The liquid laundry detergent formulation used in the cleaning tests in the subsequent Examples was prepared by combining 0.5 g of a standard liquid laundry detergent formulation with an adjusted pH of 8.5 as described in Table 5 with 1.5 g of a 1 w % aqueous solution of the cleaning booster noted in Table 6.

TABLE 5

| Ingredient | Commercial Name | wt % |
|---|---|---|
| Linear alkyl benzene sulfonate | Nacconal 90G* | 12 |
| Sodium lauryl ethoxysulfate | Steol CS-460* | 2 |
| Propylene glycol | — | 3.5 |
| Ethanol | — | 1.5 |
| Deionized water | — | QS to 100 |

*available from Stepan Company
[a] available from The Dow Chemical Company

TABLE 6

| Example | Cleaning Booster |
|---|---|
| Comparative Example C3 | None |
| Comparative Example C4 | Alcohol ethoxylate[1] |
| Example 3 | Synthesis S4 |

[1]available from Stepan Company under the tradename BIO-SOFT ® N25-9

Anti-Redeposition

The anti-redeposition performance of the combination of the standard liquid laundry detergent+cleaning booster of Comparative Examples C3-C4 and Example 3 was assessed in a Terg-o-tometer Model 7243ES agitated at 90 cycles per minute with the conditions noted in Table 7.

TABLE 7

| Parameter | Setting |
|---|---|
| Temperature | 50° C. |
| Water hardness | 300 ppm, $Ca^{2+}/Mg^{2+} = 2/1$ |
| Fabric Types | Cotton (C)<br>Cotton interlock (CI)<br>Cotton Terry (CT)<br>Polyester: cotton blend (PB)<br>Polyester knit (PK)<br>Polyester woven (PW)<br>two cloths of each type in each pot |
| Wash time | 60 minutes |
| Rinse time | 3 minutes |
| Liquid laundry detergent dosage | 0.5 g |
| Cleaning booster | 1.5 g of 1 wt % aqueous solution |
| Anti-redeposition soils | 2.5 g/L dust sebum<br>0.63 g/L Redart clay |
| Drying | After final rinse, fabrics were dried in a food dehydrator at 50° C. for 2 hours minutes |

The antiredeposition performance was determined by calculating the ΔE measured with a MACH 5+ instrument (L, a & b). The results are noted in Table 8, wherein ΔE* is according to the equation $$\Delta E^* = \Delta E_{aw} - \Delta E_{bw}$$

wherein $\Delta E_{aw}$ is measured from fabrics after washing, and $\Delta E_{bw}$ is measured from fabrics before washing. A higher ΔE* corresponds with better antiredeposition performance.

TABLE 8

| | ΔE* | | | | | |
|---|---|---|---|---|---|---|
| Example | CT | CI | CT | PB | PK | PW |
| Comp. Ex. C3 | 9.61 | 18.80 | 16.56 | 12.61 | 24.62 | 16.87 |
| Comp. Ex. C4 | 10.22 | 19.15 | 21.06 | 12.27 | 23.80 | 14.99 |
| Example 3 | 7.34 | 14.95 | 12.15 | 12.07 | 23.60 | 15.52 |

We claim:

1. A liquid laundry detergent formulation, comprising:

a liquid carrier;

a cleaning surfactant; and a cleaning booster, wherein the cleaning booster is of formula (I)

(I)

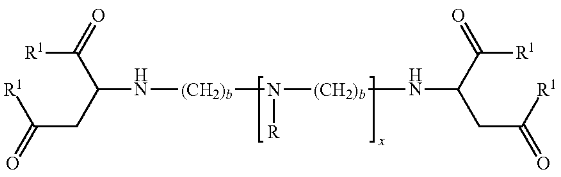

wherein b is 2 to 4; wherein x is 0 to 2; wherein each R is independently selected from the group consisting of a hydrogen, a $C_{1-22}$ alkyl group and a $-CH_2C(=O)R^1$ group; wherein each $R^1$ is independently of formula (II)

(II)

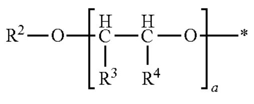

wherein the * indicates the point of attachment to formula (I); wherein $R^2$ is selected from the group consisting of a hydrogen and a $C_{1-22}$ alkyl group; wherein each $R^3$ and $R^4$ is independently selected from the group consisting of a hydrogen and a $C_{1-2}$ alkyl group, with the proviso that at least one of $R^3$ and $R^4$ is a hydrogen in each subunit a; and wherein a is 2 to 25.

2. The liquid laundry detergent formulation, of claim 1, wherein the liquid laundry detergent formulation comprises 25 to 97.9 wt %, based on weight of the liquid laundry detergent formulation, of the liquid carrier;

2 to 60 wt %, based on weight of the liquid laundry detergent formulation, of the cleaning surfactant; and 0.1 to 15 wt %, based on weight of the liquid laundry detergent formulation, of the cleaning booster.

3. The liquid laundry detergent formulation of claim 2, wherein the liquid carrier comprises water.

4. The liquid laundry detergent formulation of claim 3, wherein a is 2 to 25 in an average of 70 to 100 mol % of the occurrences of formula (II) in the cleaning booster.

5. The liquid laundry detergent formulation of claim 3, wherein 70 to 100 mol % of the $R^1$ groups in the cleaning booster of formula (II) are of formula (IIa)

$$R^5{-}O{-}[CH_2CH(R^6)O]_y{-}* \quad \text{(IIa)}$$

wherein the * indicates the point of attachment to formula (I); wherein $R^5$ is selected from the group consisting of a hydrogen and a $C_{1-22}$ alkyl group; wherein each $R^6$ is independently selected from the group consisting of a hydrogen and a $C_{1-2}$ alkyl group; and wherein y is 2 to 25.

6. The liquid laundry detergent formulation of claim 3, wherein 70 to 100 mol % of the $R^1$ groups in the cleaning booster of formula (II) are of formula (IIb)

$$R^7{-}O{-}(EO)_h{-}(PO)_i{-}(EO)_j{-}* \quad \text{(IIb)}$$

wherein the * indicates the point of attachment to formula (I); wherein $R^7$ is selected from the group consisting of a hydrogen and a $C_{1-12}$ alkyl group; wherein EO is an ethylene oxide group; wherein PO is a propylene oxide group; wherein h is 0 to 5; wherein i is 0 to 10; wherein j is 2 to 25; and wherein h+i+j is 2 to 25.

7. The liquid laundry detergent formulation of claim 6, wherein b is 2 and wherein x is 1.

8. The liquid laundry detergent formulation of claim 7, wherein R is a methyl group.

9. The liquid laundry detergent formulation of claim 8, wherein $R^7$ is a $C_{1-4}$ alkyl group; wherein h is 0 to 1; wherein i is 2 to 5; and j is 2 to 6.

10. A method of washing a fabric article, comprising:

providing a soiled fabric article;

providing a liquid laundry detergent formulation according to claim 1;

providing a wash water; and applying the wash water and the liquid laundry detergent formulation to the soiled fabric to provide a cleaned fabric article.

* * * * *